(12) United States Patent
Kugele et al.

(10) Patent No.: US 12,430,922 B2
(45) Date of Patent: Sep. 30, 2025

(54) DEVICE AND METHOD FOR ASCERTAINING A PHYSICAL PROPERTY OF A PHYSICAL OBJECT

(71) Applicant: Robert Bosch GmbH, Stuttgart (DE)

(72) Inventors: Alexander Kugele, Renningen (DE); Michael Pfeiffer, Schoenaich (DE); Thomas Pfeil, Renningen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 632 days.

(21) Appl. No.: 17/379,328

(22) Filed: Jul. 19, 2021

(65) Prior Publication Data

US 2022/0036095 A1 Feb. 3, 2022

(30) Foreign Application Priority Data

Jul. 29, 2020 (DE) .......................... 102020209538.8

(51) Int. Cl.
*G06V 20/56* (2022.01)
*B60W 30/18* (2012.01)
(Continued)

(52) U.S. Cl.
CPC ....... *G06V 20/56* (2022.01); *B60W 30/18109* (2013.01); *G06F 18/25* (2023.01);
(Continued)

(58) Field of Classification Search
CPC ....... G06F 18/25; G06F 18/241; G06N 3/049; G06N 3/08; G06N 3/084; G06N 3/045; G06V 10/82
See application file for complete search history.

(56) References Cited

U.S. PATENT DOCUMENTS 9,367,798 B2 * 6/2016 Coenen .................... G06N 3/08
10,339,447 B2 * 7/2019 Talathi .................... G06N 3/08
(Continued)

OTHER PUBLICATIONS

Lee, et al., "Spike-FlowNet: Event-based Optical Flow Estimation with Energy-Efficient Hybrid Neural Networks", (2020) arXiv, https://arxiv.org/abs/2003.06696v1, Mar. 2020 pp. 1-16 (Year: 2020).*

(Continued)

*Primary Examiner* — Matthew C Bella
*Assistant Examiner* — Janice E. Vaz
(74) *Attorney, Agent, or Firm* — NORTON ROSE FULBRIGHT US LLP

(57) ABSTRACT

A method for ascertaining a physical property of an object. The method includes detecting, for each input point in time of a sequence of input points in time, sensor data including information about a physical object, using an event-based sensor; for each subsequence of a breakdown of the sequence of input points in time into multiple subsequences including: feeding the sensor data detected for the input points in time of the subsequence to a pulsed neural network which generates a first processing result of the subsequence; feeding the processing result of the subsequence to a non-pulsed neural network; and processing the processing result of the subsequence by non-pulsed neurons of one or multiple first layer(s) of the non-pulsed neural network for generating a second processing result of the subsequence; and feeding the second processing results of the multiple subsequences to one or multiple second layer(s) of the non-pulsed neural network.

8 Claims, 3 Drawing Sheets

(51) Int. Cl.
*G06F 18/25* (2023.01)
*G06N 3/049* (2023.01)
*G06N 3/08* (2023.01)
*G06V 10/75* (2022.01)

(52) U.S. Cl.
CPC .............. *G06N 3/049* (2013.01); *G06N 3/08* (2013.01); *G06V 10/751* (2022.01)

(56) References Cited

U.S. PATENT DOCUMENTS

| 2015/0206050 A1* | 7/2015 | Talathi | G06N 3/048 706/15 |
| 2022/0126878 A1* | 4/2022 | Moustafa | B60W 50/16 |

OTHER PUBLICATIONS

Lee, et al.: "Spike-FlowNet: Event-based Optical Flow Estimation with Energy-Efficient Hybrid Neural Networks", (2003) arXiv, https://arxiv.org/abs/2003.06696v1, accessed Mar. 14, 2020, pp. 1-16.

* cited by examiner

DEVICE AND METHOD FOR ASCERTAINING A PHYSICAL PROPERTY OF A PHYSICAL OBJECT

CROSS REFERENCE

The present application claims the benefit under 35 U.S.C. § 119 of German Patent Application No. DE 102020209538.8 filed on Jul. 29, 2020, which is expressly incorporated herein by reference in its entirety.

SUMMARY

Different exemplary embodiments relate, in general, to devices and methods for ascertaining a physical property of a physical object.

In the case of an event-based camera, it is not always the entire image, i.e., all pixels of a frame, that is transferred, but only the pixel values which have changed. As a result, it is not necessary to wait with the processing until the entire image (frames) has been rendered. Such event-based cameras are considerably better suited in certain application scenarios, such as, e.g., for motion estimation during autonomous driving, than conventional cameras due to their high temporal resolution. Due to their fundamentally different mode of operation, conventional image processing methods, in particular, conventional architectures of neural networks for image processing, are not effective for processing image data provided by event-based cameras.

Accordingly, an efficient processing of image data provided by event-based cameras (or, in general, of sensor data from an event-based sensor) is desirable for different tasks, for example for supervision in manufacturing (e.g., detecting defective components) or for recognizing objects during autonomous driving.

According to different specific embodiments, a method for ascertaining a physical property of a physical object is provided, which includes detecting, for each input point in time of a sequence of input points in time, sensor data with the aid of an event-based sensor, the sensor data including pieces of information about the one or multiple physical object(s), for each subsequence of a breakdown of the sequence of input points in time into multiple subsequences including:

feeding the sensor data detected for the input points in time of the subsequence to a pulsed neural network;
processing the sensor data of the input points in time of the subsequence by pulsed neurons of the pulsed neural network for generating a first processing result of the subsequence, the pulsed neurons in each case integrating values of sensor data of different input points in time of the subsequence;
feeding the processing result of the subsequence to a non-pulsed neural network; and
processing the processing result of the subsequence by non-pulsed neurons of one or multiple first layer(s) of the non-pulsed neural network for generating a second processing result of the subsequence, and furthermore feeding the second processing results of the multiple subsequences to one or multiple second layer(s) of the non-pulsed neural network; combining the processing results of the multiple subsequences by non-pulsed neurons of the one or multiple second layer(s) of the non-pulsed neural network in that the non-pulsed neurons of the one or multiple second layer(s) in each case calculate a weighted sum of values of second processing results of different subsequences, and ascertaining the physical property of the physical object from the outputs of the non-pulsed neurons of the one or multiple second layer(s).

The above-described method enables an efficient processing of sensor-based sensor data, during which, in particular, the accumulation of sensor data (over the time), e.g., at the input of the pulsed neural network, may be dispensed with. In this way, the loss of temporal information may be avoided or at least reduced. At the same time, the method enables the use of efficient and proven architectures of non-pulsed neural networks, such as for example a convolutional network, for example to carry out a classification or an estimation of the optical flow (e.g., for the motion estimation) of the sensor data.

Different exemplary embodiments are described hereafter.

Exemplary embodiment 1 is a method for ascertaining a physical property of a physical object as described above.

Exemplary embodiment 2 is the method according to exemplary embodiment 1, the event-based sensor supplying sensor data for multiple components of a sensor data vector, and the non-pulsed neurons of the non-pulsed neural network for generating a second processing result of the subsequence, the non-pulsed neurons calculating weighted sums of values of second processing results of different components of the sensor data vector.

An analysis across components (e.g., spatial components or also frequency components) of the sensor data thus takes place in the non-pulsed neural network, for example with the aid of a convolutional network. For this purpose, efficient techniques may be used for the classification or regression.

Exemplary embodiment 3 is the method according to exemplary embodiment 1 or 2, the input points in time being the points in time of events to which the event-based sensor responds by outputting sensor data.

In this way, a reduction in the temporal resolution compared to the temporal resolution of the sensor is avoided. In this way, the maximum information volume is preserved.

Exemplary embodiment 4 is the method as recited in one of exemplary embodiments 1 through 3, including feeding, for each subsequence, at least a portion of the outputs of the pulsed neurons to a further neural network, the further neural network carrying out a classification which establishes the end of the subsequence.

Exemplary embodiment 5 is the method as recited in one of exemplary embodiments 1 through 4, including ascertaining, for each subsequence, the number of at least a portion of the outputs of the pulsed neurons per unit of time, and ending the subsequence when the outputs of the pulsed neurons per unit of time exceed a threshold value.

Exemplary embodiments 4 and 5 illustrate a "trigger" for processing by the non-pulsed neural network (i.e., a trigger for a forward pass by the non-pulsed neural network). In this way, it is achieved that resources for the processing by the neural network are only expended when the processing "is worth it," i.e., when a new piece of information is to be expected. A high number of pulses in the SNN, for example, may indicate that a new object has entered the sensor area, and the processing by the ANN could thus supply a new piece of information (e.g., about a physical property of the new object).

Exemplary embodiment 6 is a method for controlling an actuator, including ascertaining a physical property of a physical object according to the method as recited in one of exemplary embodiments 1 through 5, and controlling an actuator as a function of the ascertained physical property of the physical object.

Exemplary embodiment 7 is a method for detecting an anomaly of a physical object, including ascertaining a physical property of a physical object according to the method as recited in one of exemplary embodiments 1 through 5, comparing the ascertained physical property of the physical object to a reference property of the physical object, and establishing that the physical object has an anomaly when the ascertained physical property deviates from the reference property.

Exemplary embodiment 8 is a device which is configured to carry out the method as recited in one of exemplary embodiments 1 through 7.

Exemplary embodiment 9 is a computer program, including program instructions which, when they are executed by one or multiple processor(s), prompt the one or multiple processor(s) to carry out a method according to one of exemplary embodiments 1 through 7.

Exemplary embodiment 10 is a computer-readable memory medium on which program instructions are stored, which, when they are executed by one or multiple processor(s), prompt the one or multiple processor(s) to carry out a method according to one of exemplary embodiments 1 through 7.

Exemplary embodiments of the present invention are shown in the figures and are described in greater detail hereafter. In the figures, identical reference numerals everywhere in the multiple views in general relate to the same parts. The figures are not necessarily true to scale, the focus instead being placed in general on the illustration of the features of the present invention.

DETAILED DESCRIPTION OF EXAMPLE EMBODIMENTS

The different specific embodiments, in particular, the exemplary embodiments described hereafter, may be implemented with the aid of one or multiple circuit(s). In one specific embodiment, a "circuit" may be understood to mean any kind of logic-implementing entity, which may be hardware, software, firmware, or a combination thereof. In one specific embodiment, a "circuit" may thus be a hard-wired logic circuit or a programmable logic circuit, such as for example a programmable processor, for example a microprocessor. A "circuit" may also be software which is implemented or executed by a processor, for example any kind of computer program. Any other kind of implementation of the respective functions, which are described in greater detail hereafter, may be understood as a "circuit" in agreement with an alternative specific embodiment.

During machine learning, a function is learned which maps input data (e.g., sensor data) to output data. During learning (i.e., the training of a neural network or of another model), the function is determined from an input data set (also referred to as training data set), which specifies a desired output (e.g., a desired classification of the input data) for each input, in such a way that it maps this assignment of inputs to outputs in the best possible manner.

Figure 1:
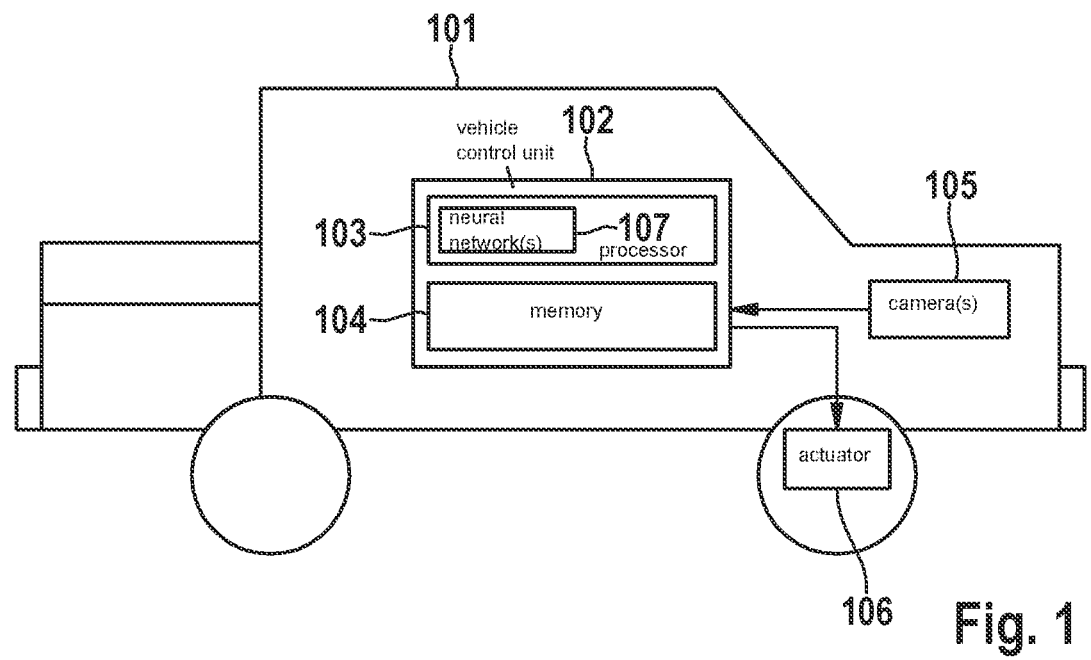
FIG. 1 shows a vehicle according to one specific embodiment of the present invention.

One example of an application of such a machine-learned function is the object classification or motion estimation for autonomous driving, as is illustrated in FIG. 1.

FIG. 1 shows a vehicle 101.

It must be noted that hereafter images or image data may be interpreted in very general terms as a collection of data which represent one or multiple object(s) or pattern(s). The image data may be provided by sensors (in particular, event-based sensors), which measure visible or invisible light, such as for example infrared or ultraviolet light, ultrasonic or radar waves, or other electromagnetic or acoustic signals.

In the example of FIG. 1, a vehicle 101, for example a passenger car or a truck, is provided with a vehicle control unit 102.

Vehicle control unit 102 includes data processing components, e.g., a processor (e.g., a CPU (central unit)) 103 and a memory 104 for storing control software, according to which vehicle control unit 102 operates, and data which are processed by processor 103.

For example, the stored control software includes (computer program) instructions which, when the processor executes them, cause processor 103 to implement one or multiple neural network(s) 107.

The data stored in memory 104 may include image data, for example, which are detected by one or multiple camera(s) 105. The one or the multiple camera(s) 105 may, for example, record one or multiple grayscale or color photos of the surroundings of vehicle 101.

Based on the image data, vehicle control unit 102 is able to ascertain whether and which objects, e.g., fixed objects such as traffic signs or road markings, or movable objects such as pedestrians, animals, and other vehicles, are present in the surroundings of vehicle 101, and at what speed they are moving relative to vehicle 101.

Vehicle 101 may then be controlled by vehicle control unit 102 according to the results of the object determination. Vehicle control unit 102 may, for example, control an actuator 106 (e.g., a brake) to control the speed of the vehicle, e.g., to decelerate the vehicle.

Camera (or one of cameras) 105 is an event-based camera, for example. Event-based cameras are a novel camera technology which is able to generate rapid and efficient representations of the real world with high temporal resolution. In contrast to normal cameras, an event-based camera outputs a stream of events, each event representing a binary change in the brightness at a certain pixel at a certain point in time. This is especially suitable for the motion estimation at high speed and for the navigation with little light, whereas conventional cameras (which provide image data frame by frame) have difficulty in such applications.

Today, non-pulsed artificial neural networks (ANNs) are the standard for processing image data. However, these are only conditionally suitable for processing event data since they typically process input data synchronously and using dense matrices. Event data, in contrast, are sparse and asynchronous.

One option for processing event data is to reduce the temporal resolution by accumulating an established number of events. In this way, the raw data which are supplied by event-based camera 105 are converted into a sequence of dense matrices. This representation may be utilized for training a conventional neural network (ANN), which is able to reconstruct grayscale images. Conventional algorithms of machine vision may then be applied thereto. However, due to the accumulation, the procedure limits the temporal resolution. As a result, information is lost.

Hereafter, exemplary embodiments are described which enable a high temporal resolution and are suitable for general tasks. According to different specific embodiments, a split neural network (e.g., as neural network 107) is used, as it is shown in FIG. 2.

Figure 2:
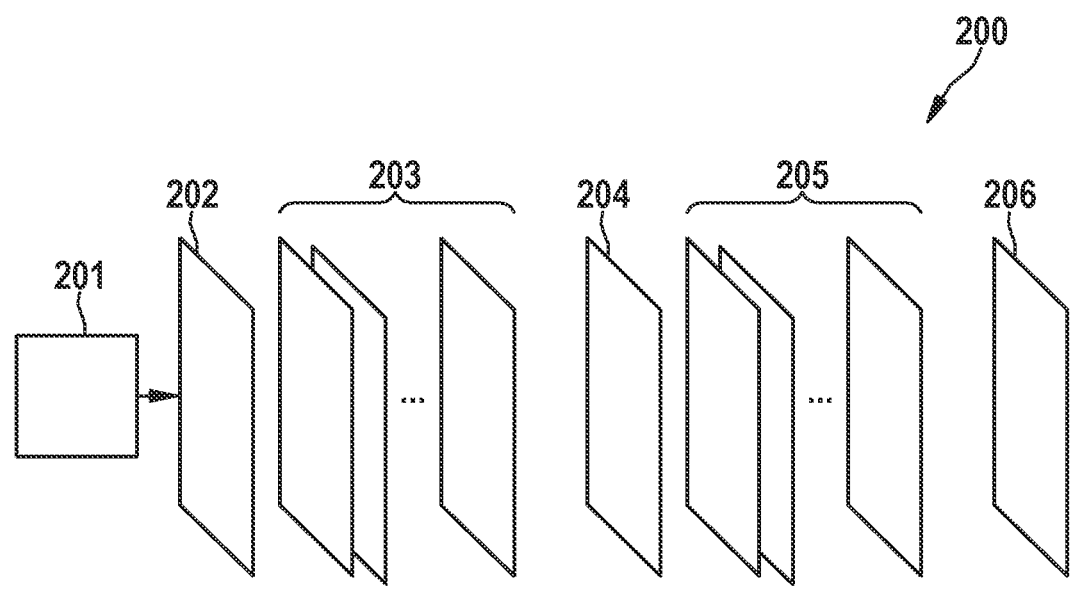
FIG. 2 shows a neural network according to one specific embodiment of the present invention.

FIG. 2 shows a neural network 200 according to one specific embodiment.

Neural network 200 receives data from an event-based sensor (e.g., camera 105) with the aid of an input layer 202. The output of neural network 200 occurs via an output layer 206.

Between input layer 202 and output layer 206, neural network 200 includes a sequence of layers 203, 204, 205.

Neural network 200 is split insofar as the sequence of layers includes a first group of layers 203 (first subsequence of layers) and a second group of layers 205 (second subsequence of layers). The two groups are connected in this example by an (optional) intermediate layer 204.

The layers of first group 202 are made up of pulsed (spiking) neurons, whereas the layers of second group 202 include conventional artificial neurons (i.e., non-pulsed neurons).

A pulsed neuron has an internal state V(t) which may change over time t. Communication between a pulsed neuron and a subsequent neuron takes place by the pulsed neuron emitting pulses (so-called spikes), a typically binary signal, signals including multiple bits of information also being possible.

A pulsed neuron emits a pulse when its internal state exceeds or drops below a certain threshold value. This kind of information transfer is inspired by the mode of processing in the human brain.

The neural network may, for example, output an estimation of the optical flow in a scene recorded by the event-based camera. It may be trained (for example for such a task, but also for the classification or regression) end to end with the aid of backpropagation, it being possible to use an approximation for the gradient calculation for the pulsed neurons to enable a stable calculation of the gradients.

A pulsed neuron may be described in continuous time by a (leaky) integrate and fire (LIF) model:

$$\tau_{mem} \frac{dU_i^{(l)}}{dt} = -\left(U_i^{(l)} - U_{rest}\right) + RI_i^{(l)}$$

where
$\tau_{mem}$ is the membrane time constant;
$U_i^{(l)}$ is the membrane voltage;
$U_{rest}$ is the resting potential;
R is a resistance; and
$I_i^{(l)}$ is an input current;
l is the index of the layer in which the neuron is situated; and
i is the index of the neuron.

If, according to the model, the pulsed neuron does not lose any voltage over the time, i.e., $\tau_{mem}$=0, this is referred to as an integrate and fire model.

The input current is usually a number of pulses, modeled by a sum of Dirac delta functions and a weight w which weights the synapse from another (preceding pulsed) neuron to the neuron:

$$I_i^{(l)}(t) = \sum_{k=0} w\delta(t - t_k).$$

An activation function $S(U(t)) = \Theta(U(t) - U_{rest})$ determines whether the neuron emits a pulse to one or multiple subsequent neuron(s) connected to the neuron.

For the simulation of this model, a discretization in the time is carried out ($U_{rest}$ in this example being set to zero). The following formulation is obtained:

$$I_i^{(l)}[n+1] = \alpha I_i^{(l)}[n] + \sum_j W_{ij}^{(l)} S_j^{(l)}[n] + \sum_j V_{ij}^{(l)} S_j^{(l)}[n] \quad (1)$$

$$U_i^{(l)}[n+1] = \beta U_i^{(l)}[n] + I_i^{(l)}[n] - S_i^{(l)}[n] \quad (2)$$

Equation (1) describes the input current, and equation (2) describes the voltage of a neuron (having index i) of a layer (having index l), which is connected to neurons (each having a respective index j) to a time step n+1.

In the sums, $W_{ij}^{(l)}$ and $V_{ij}^{(l)}$ are weights, the weights $V_{ij}^{(l)}$ being intended to illustrate that neurons of a layer may also be connected to themselves.

The term $$\alpha \equiv \exp\left(-\frac{\Delta_t}{\tau_{syn}}\right)$$

having a positive time constant $\tau_{mem}$ is a decrease intensity, with 0<α<1. $S_j^{(l)}[n] \in \{0,1\}$ applies, $S_i^{(l)}[n]$ being a non-linear function of membrane voltage $U_i^{(l)}[n]$, for example $S_i^{(l)}[n] \equiv \Theta(U_i^{(l)}[n]-i))$, with Θ being the theta function (or Heaviside function).

Constant β is given by $$\beta \equiv \exp\left(-\frac{\Delta_t}{\tau_{mem}}\right)$$

having a positive time constant $\tau_{mem}$. According to one specific embodiment, the borderline cases α=1 and β=1 are also specifically used.

To train neural network 200 using backpropagation (more precisely backpropagation through time (BPTT)), a calculation of the derivative of the activation function is necessary. However, since the activation function is described by theta functions, a simple approximative calculation of the derivative would cause the derivative to be 0 at every point, and thus making it impossible to calculate an update of the weights.

This may be circumvented when using an auxiliary function for the calculation of the update, e.g., $$\Theta(t) \approx \sigma(t, a) = \frac{1}{1 - e^{-ax}}.$$

This makes it possible to calculate updates (i.e., training updates) for the weights of the SNN (i.e., the pulsed neurons of the first group of layers 203). Neural network 200 may thus be trained, the weights of the ANN (i.e., the weights of the neurons of the second group of layers 205) being updated with the aid of conventional backpropagation, while the updates for the weights of the SNN neurons are calculated with the aid of the above-described approximation.

The event stream of an event-based camera may be divided into multiple input vectors (or input tensors), the division being based on a predefined time step dt. These input vectors are used to train a neural network having a hybrid SNN-ANN architecture, as is shown in FIG. 2.

According to one specific embodiment, the architecture has at least a portion of the following features:

The SNN is made up of one or multiple layer(s) which may be arbitrarily connected to one another. The delay of each connection is also arbitrarily settable.

The SNN is characterized by a communication via event packets, and neurons of the SNN have an internal state.

The ANN outputs a prediction based on the output vectors of the SNN. This may, for example, be the internal state of the last layer of the SNN, or accumulated spikes from different layers.

A so-called trigger may be present between the SNN and the ANN, which decides when the ANN is executed. This may, for example, be implemented by an ANN or an SNN, which is trained in addition to the existing structure, for example to predict whether a new object is visible in the input vector or an object has moved.

The bandwidth between SNN layers and between the SNN and ANN may be regulated, for example by integrating an additional loss term for the generation of spikes/events into the optimization or always using only a portion of the network.

Optionally, the SNN may, as an alternative to or in combination with backpropagation, be trained using local learning methods known from neuroscience, such as for example spike timing dependent plasticity (STDP). The neural network may also be trained end to end.

For the training, a set of event data of an event-based sensor is collected. The neural network is implemented and initialized (e.g., random values).

The data output by the SNN may be pre-processed by the ANN prior to processing. For example, pulses or the internal states of the SNN neurons (e.g., in transition layer 204) may be accumulated.

According to different specific embodiments, the SNN processes the input data of the event-based camera, which the event-based camera supplies within a certain time, i.e., for a subsequence of input points in time (of an overall sequence of input points in time), and outputs the result to the ANN. The ANN processes the results of the processing of input data of different subsequences individually (e.g., independently of one another), and then combines the results of these processings (for different subsequences) with one another, as is shown in FIG. 3.

Figure 3:
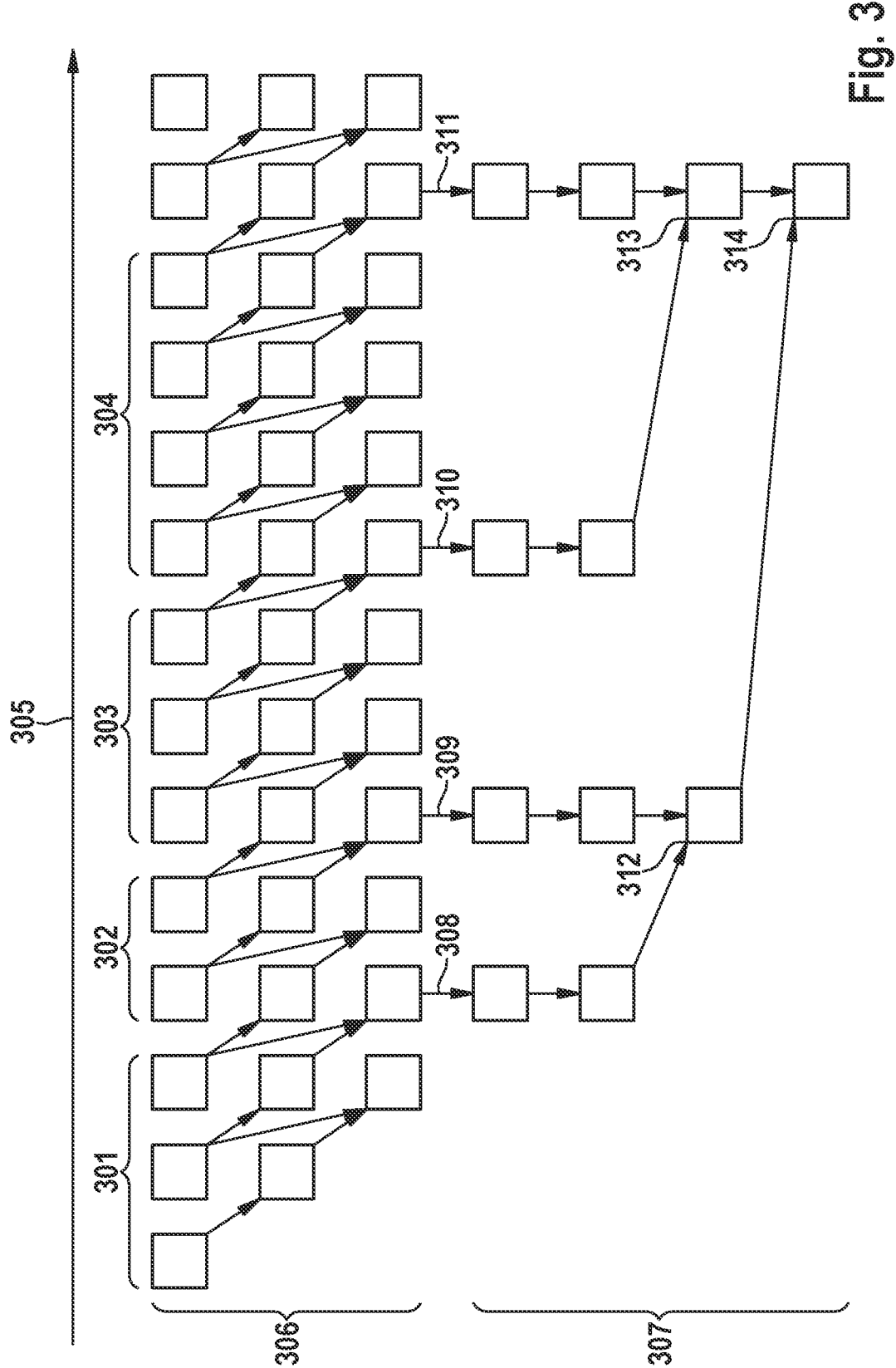
FIG. 3 illustrates the processing of sensor data by an event-based camera (or, in general, an event-based sensor) over the time according to one specific embodiment of the present invention.

FIG. 3 illustrates the processing of sensor data by an event-based camera (or, in general, an event-based sensor) over the time.

The time progresses from left to right along a time axis 305.

The layer depth increases from top to bottom, i.e., blocks shown further down, which in each case symbolize data in neural network 200, are situated in deeper layers of neural network 200 (i.e., further to the right in the illustration of FIG. 2).

The top three rows 306 represent the processing in the SNN, and the bottom four rows 307 represent the processing in the ANN.

The uppermost layer corresponds to the first layer of the SNN. Each block of the first layer corresponds to the receipt of sensor input data from the event-based sensor at an input point in time at which an event occurs, in response to which the sensor supplies input data. As an alternative, input data may be gathered over the duration of a (small) time step dt, so that the input points in time are situated, for example, regularly at a distance dt across the time axis. Value dt, for example, is in the range of 0.1 ms to 1 ms, however, in more extreme cases may also be in the range of 0.01 ms to 10 ms, depending on the application.

The input points in time are grouped in groups 301, 302, 303, and 304 in this example. Input data which the SNN has received at the input points in time of a group 301, 302, 303, and 304 are processed by the SNN, and then the joint processing result of the respective group in 308, 309, 310 or 311 is forwarded to the ANN.

As shown, input data of a preceding group may still have influence on the processing of input data of a subsequent group (illustrated by arrows which go beyond group boundaries). However, at certain points in time 308, 309, 310, 311, results are forwarded from the SNN to the ANN, into which the input data up to the end of the associated group (i.e., e.g., first group 301 for first forwarding point in time 308) have been incorporated.

The ANN combines the processing results of multiple groups, e.g., those of first group 301 and of second group 302 in 312, those of third group 303 and of fourth group 304 in 313, and ultimately of all four groups in 314.

The result of the last combination is the processing of the sensor data of the four groups 301 through 304.

The delay between two SNN layers is one time step, for example. In the ANN, the delay is zero. As shown, a connection exists in this example between the first layer of the SNN to the third layer of the SNN. The data volume may also change from layer to layer, e.g., as in the case of an encoder-decoder structure. For example, the data volume in the third SNN layer is reduced.

Figure 4:
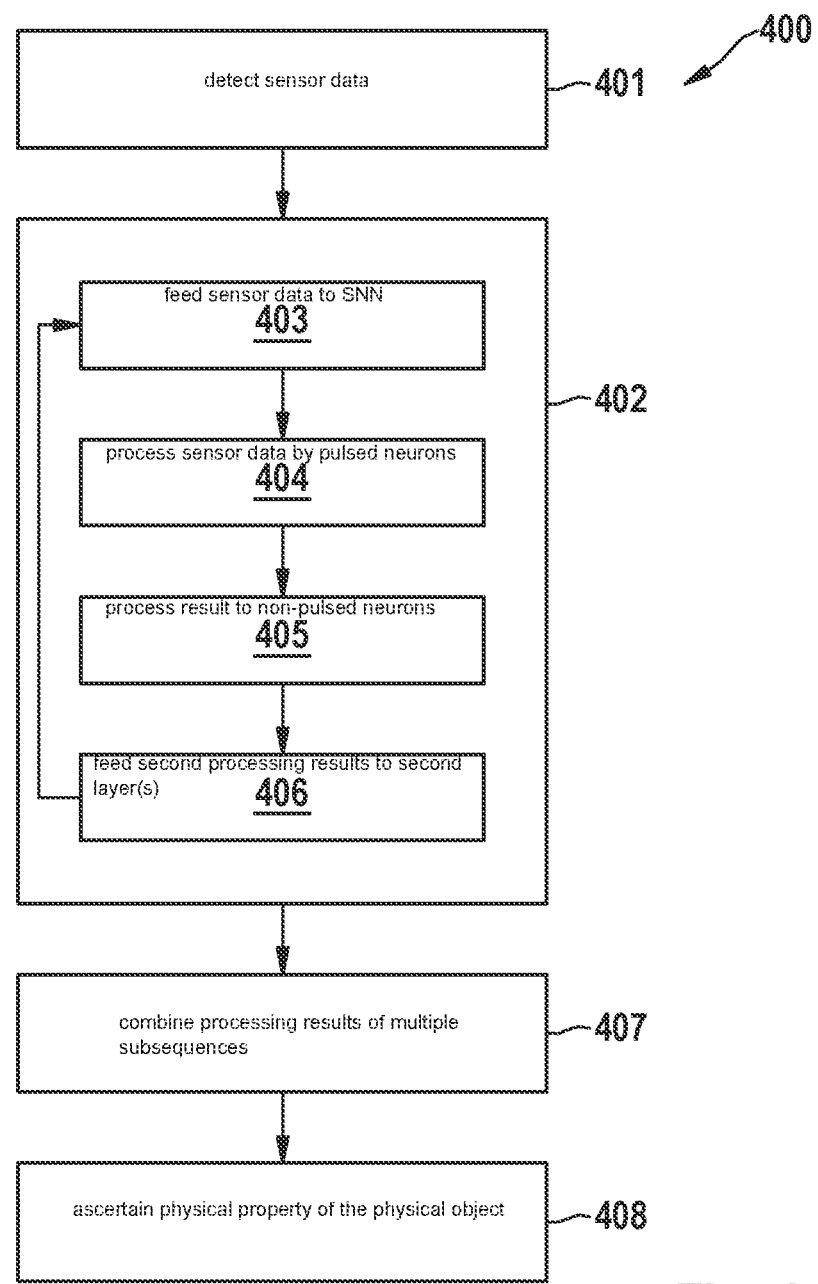
FIG. 4 shows a flowchart which represents a method for ascertaining a physical property of a physical object according to one specific embodiment of the present invention.

In summary, a method is provided according to different specific embodiments, as it is shown in FIG. 4.

FIG. 4 shows a flowchart 400 which represents a method for ascertaining a physical property of a physical object.

In 401, sensor data are detected with the aid of an event-based sensor for each input point in time of a sequence of input points in time, the sensor data including pieces of information about the one or multiple physical object(s).

In 402, for each subsequence of a breakdown of the sequence of input points in time into multiple subsequences, in 403 the sensor data detected for the input points in time of the subsequence is fed to a pulsed neural network (SNN).

In 404, the sensor data of the input points in time of the subsequence are processed by pulsed neurons of the pulsed neural network for generating a first processing result of the subsequence, the pulsed neurons in each case integrating values of sensor data of different input points in time of the subsequence;

in 404, the processing result of the subsequence is fed to a non-pulsed neural network (ANN); and in 405, the processing result of the subsequence is processed by non-pulsed neurons of one or multiple first layer(s) of the non-pulsed neural network for generating a second processing result of the subsequence.

In 406, the second processing results of the multiple subsequences are fed to one or multiple second layer(s) of the non-pulsed neural network.

In 407, the processing results of the multiple subsequences are combined by non-pulsed neurons of the one or multiple second layer(s) of the non-pulsed neural network in that the non-pulsed neurons of the one or multiple second layer(s) in each case calculate a weighted sum of values of second processing results of different subsequences.

In 408, the physical property of the physical object is ascertained from the outputs of the non-pulsed neurons of the one or multiple second layer(s).

The event-based sensor is, for example, an event-based camera or another event-based sensor, such as neuromorphic cochlea or an Internet of Things (IoT) device which sends information, triggered by an event.

The output of the neural network (i.e., the output information for the ascertained physical property of the physical object) may be used in a control unit of a device or of a system which is configured to control the device or the system as a function of the output of the neural network, such as a robot, for example. A "robot" may be understood to mean any physical system (including a mechanical part whose movement is controlled), such as a computer-controlled machine, a vehicle, a household appliance, a power tool, a manufacturing machine, a personal assistant, or an access control system. The output of the neural network may also be used for a system for conveying information, e.g., for a medical (imaging) process.

The neural network may be used for the regression or classification of data provided by an event-based sensor, i.e., the physical property may be ascertained from a classification or regression result. The data are provided, e.g., by an event-based camera and represent a scene. In the process, the term 'classification' also encompasses a semantic segmentation, e.g., of an image (which may be regarded as a pixelwise classification). The term 'classification' also encompasses a detection, e.g., of an object (which may be regarded as a classification regardless whether the object is present or not). Application examples are the localization and tracking of cars and pedestrians in road traffic in real time, the tracking of persons on a supervision camera in a factory building, or the determination of the position of oil droplets moving at high velocity across a water film.

The output of the neural network (e.g., a classification) may be used (e.g., by a corresponding control unit) for the detection of anomalies, e.g., for the detection of defects in manufactured components.

The physical property may be ascertained by an appropriate interpretation of the outputs of the non-pulsed neurons of the one or multiple second layer(s). For example, the non-pulsed neurons of the one or multiple second layer(s) output Softmax values which indicate a class association. The non-pulsed neurons of the one or multiple second layer(s) may also output values, for example, which specify motion vectors, e.g., a motion map, i.e., a direction of motion and a speed of motion for each pixel of an image. The physical property may thus be ascertained by reading from the output of the non-pulsed neurons of the one or multiple second layer(s). However, a further processing may also be provided, e.g., an averaging over certain areas (which, in turn, is given by a segmentation output by the neural network), etc.

The method is computer-implemented according to one specific embodiment.

Even though the present invention was primarily shown and described with reference to certain specific embodiments, it should be understood by those familiar with the technical field that numerous modifications with respect to the configuration and details thereon may be carried out, without departing from the essence and the field of the present invention.

What is claimed is:

1. A method for ascertaining a physical property of a physical object, comprising the following steps:
    detecting sensor data using an event-based sensor for each input point in time of a sequence of input points in time, the sensor data including pieces of information about the physical object;
    for each subsequence of a breakdown of the sequence of input points in time into multiple subsequences:
        feeding the sensor data detected for the input points in time of the subsequence to a pulsed neural network,
        processing the sensor data of the input points in time of the subsequence by pulsed neurons of the pulsed neural network for generating a first processing result of the subsequence, the pulsed neurons in each case integrating values of sensor data of different input points in time of the subsequence;
        feeding the first processing result of the subsequence to a non-pulsed neural network, and
        processing the first processing result of the subsequence by non-pulsed neurons of one or multiple first layer(s) of the non-pulsed neural network for generating a second processing result of the subsequence;
    feeding the second processing results of the multiple subsequences to one or multiple second layer(s) of the non-pulsed neural network;
    combining the second processing results of the multiple subsequences by non-pulsed neurons of the one or multiple second layer(s) of the non-pulsed neural network in that the non-pulsed neurons of the one or multiple second layer(s) in each case calculate a weighted sum of values of second processing results of different subsequences; and
    ascertaining the physical property of the physical object from outputs of the non-pulsed neurons of the one or multiple second layer(s), wherein a trigger determines when the processing by the non-pulsed neural network is executed, wherein the trigger corresponds to the pulsed neural network generating a number of pulses that meets a threshold amount of pulses.

2. The method as recited in claim 1, wherein the event-based sensor supplies sensor data for multiple components of a sensor data vector, and the non-pulsed neurons of the non-pulsed neural network, for generating the second processing result of the subsequence, calculate weighted sums of values of second processing results of different components of the sensor data vector.

3. The method as recited in claim 1, wherein the input points in time are points in time of events to which the event-based sensor responds by outputting sensor data.

4. The method as recited in claim 1, further comprising:
    feeding, for each subsequence, at least a portion of outputs of the pulsed neurons to a further neural network, the further neural network carrying out a classification which establishes an end of the subsequence.

5. The method as recited in claim 1, further comprising:
    ascertaining, for each subsequence, a number of at least a portion of outputs of the pulsed neurons per unit of time, and ending the subsequence when the outputs of the pulsed neurons per unit of time exceed a threshold value.

6. A method for controlling an actuator, comprising the following steps:
ascertaining a physical property of a physical object by:
  detecting sensor data using an event-based sensor for each input point in time of a sequence of input points in time, the sensor data including pieces of information about the physical object;
  for each subsequence of a breakdown of the sequence of input points in time into multiple subsequences:
    feeding the sensor data detected for the input points in time of the subsequence to a pulsed neural network,
    processing the sensor data of the input points in time of the subsequence by pulsed neurons of the pulsed neural network for generating a first processing result of the subsequence, the pulsed neurons in each case integrating values of sensor data of different input points in time of the subsequence;
    feeding the first processing result of the subsequence to a non-pulsed neural network, and
    processing the first processing result of the subsequence by non-pulsed neurons of one or multiple first layer(s) of the non-pulsed neural network for generating a second processing result of the subsequence;
  feeding the second processing results of the multiple subsequences to one or multiple second layer(s) of the non-pulsed neural network;
  combining the second processing results of the multiple subsequences by non-pulsed neurons of the one or multiple second layer(s) of the non-pulsed neural network in that the non-pulsed neurons of the one or multiple second layer(s) in each case calculate a weighted sum of values of second processing results of different subsequences; and
  ascertaining the physical property of the physical object from outputs of the non-pulsed neurons of the one or multiple second layer(s); and
controlling an actuator as a function of the ascertained physical property of the physical object, wherein a trigger determines when the processing by the non-pulsed neural network is executed, wherein the trigger corresponds to the pulsed neural network generating a number of pulses that meets a threshold amount of pulses.

7. A device configured to ascertain a physical property of a physical object, the device configured to:
  detect sensor data using an event-based sensor for each input point in time of a sequence of input points in time, the sensor data including pieces of information about the physical object;
  for each subsequence of a breakdown of the sequence of input points in time into multiple subsequences:
    feed the sensor data detected for the input points in time of the subsequence to a pulsed neural network,
    process the sensor data of the input points in time of the subsequence by pulsed neurons of the pulsed neural network for generating a first processing result of the subsequence, the pulsed neurons in each case integrating values of sensor data of different input points in time of the subsequence;
    feed the first processing result of the subsequence to a non-pulsed neural network, and
    process the first processing result of the subsequence by non-pulsed neurons of one or multiple first layer(s) of the non-pulsed neural network for generating a second processing result of the subsequence;
  feed the second processing results of the multiple subsequences to one or multiple second layer(s) of the non-pulsed neural network;
  combine the second processing results of the multiple subsequences by non-pulsed neurons of the one or multiple second layer(s) of the non-pulsed neural network in that the non-pulsed neurons of the one or multiple second layer(s) in each case calculate a weighted sum of values of second processing results of different subsequences; and
  ascertain the physical property of the physical object from outputs of the non-pulsed neurons of the one or multiple second layer(s), wherein a trigger determines when the processing by the non-pulsed neural network is executed, wherein the trigger corresponds to the pulsed neural network generating a number of pulses that meets a threshold amount of pulses.

8. A non-transitory computer-readable memory medium on which are stored program instructions for ascertaining a physical property of a physical object, the program instructions, when executed by one or multiple processors, causing the one or multiple processors to perform the following steps:
  detecting sensor data using an event-based sensor for each input point in time of a sequence of input points in time, the sensor data including pieces of information about the physical object;
  for each subsequence of a breakdown of the sequence of input points in time into multiple subsequences:
    feeding the sensor data detected for the input points in time of the subsequence to a pulsed neural network,
    processing the sensor data of the input points in time of the subsequence by pulsed neurons of the pulsed neural network for generating a first processing result of the subsequence, the pulsed neurons in each case integrating values of sensor data of different input points in time of the subsequence;
    feeding the first processing result of the subsequence to a non-pulsed neural network, and
    processing the first processing result of the subsequence by non-pulsed neurons of one or multiple first layer(s) of the non-pulsed neural network for generating a second processing result of the subsequence;
  feeding the second processing results of the multiple subsequences to one or multiple second layer(s) of the non-pulsed neural network;
  combining the second processing results of the multiple subsequences by non-pulsed neurons of the one or multiple second layer(s) of the non-pulsed neural network in that the non-pulsed neurons of the one or multiple second layer(s) in each case calculate a weighted sum of values of second processing results of different subsequences; and
  ascertaining the physical property of the physical object from outputs of the non-pulsed neurons of the one or multiple second layer(s), wherein a trigger determines when the processing by the non-pulsed neural network is executed, wherein the trigger corresponds to the pulsed neural network generating a number of pulses that meets a threshold amount of pulses.

* * * * *